United States Patent [19]
Hellermann et al.

[11] Patent Number: 4,942,980
[45] Date of Patent: Jul. 24, 1990

[54] VENDING MACHINE

[75] Inventors: Eberhard Hellermann, Walldorf/Frankfurt; Hans-Jürgen Welsch, Mannheim, both of Fed. Rep. of Germany

[73] Assignee: Harting Elektronik GmbH, Espelkamp, Fed. Rep. of Germany

[21] Appl. No.: 319,583

[22] Filed: Mar. 6, 1989

[30] Foreign Application Priority Data

Mar. 12, 1988 [DE] Fed. Rep. of Germany ....... 3808253

[51] Int. Cl.$^5$ ............................................ B65G 59/00

[52] U.S. Cl. .................................... 221/244; 221/251; 221/261; 221/254; 221/290; 221/129

[58] Field of Search ............... 221/129, 130, 131, 244, 221/251, 261, 290, 293, 254, 267, 281

[56] References Cited

U.S. PATENT DOCUMENTS

| | | | |
|---|---|---|---|
| 2,500,438 | 3/1950 | Tandler et al. | 221/129 |
| 3,325,049 | 6/1967 | Craven et al. | 221/129 |
| 3,502,382 | 3/1970 | Rainey | 221/251 |
| 4,200,201 | 4/1980 | Collins et al. | 221/129 |
| 4,591,070 | 5/1986 | Wirstlin | 221/129 |

FOREIGN PATENT DOCUMENTS

| | | | |
|---|---|---|---|
| 2267593 | 11/1975 | France | 221/194 |

*Primary Examiner*—H. Grant Skaggs
*Attorney, Agent, or Firm*—Jordan and Hamburg

[57] ABSTRACT

For a vending machine for dispensing parallelepiped products, which are arranged in horizontal product stacks, a dispensing device is provided, which separates the first product package to be dispensed by tipping the package away from the product stack, with the remaining product stack being held in place. It is furthermore provided that the product package falls onto an inclined plane when tipped, from which it slides down under its own weight and reaches the dispensing opening of the vending machine. It is further provided that the dispensing device follows the product stack as the products are dispensed, or that the product stack be made so that it can move towards the dispensing device. The dispensing device is arranged on horizontal guide rails and several dispensing devices can be provided within one product row.

28 Claims, 6 Drawing Sheets

VENDING MACHINE

Figure 1:
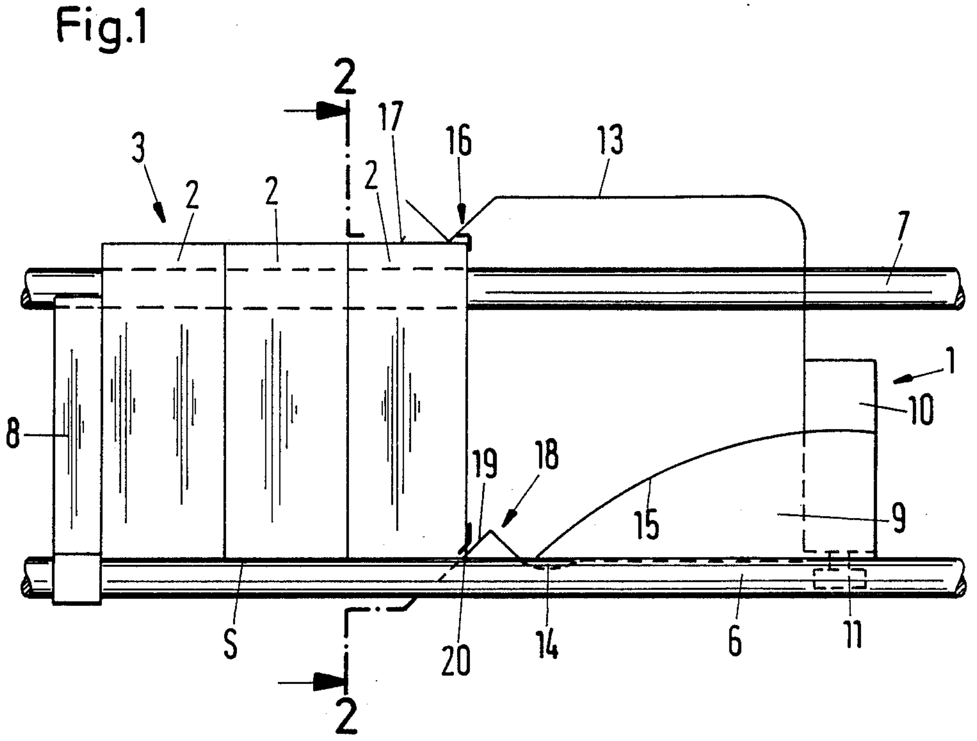

The invention relates to a vending machine for dispensing parallelepiped products, particularly cigarette packages, where the products are provided in a horizontal arrangement in at least one product stack, and where a dispensing device separates the first package of the stack in each case and passes it to a dispensing opening of the vending machine. In such vending machines it is required that the product stack be provided with corresponding holders/guides, which ensure that only the first package in each case is dispensed, and that the other packages in the stack are held so that they are secure against manipulation. It must also be ensured that refilling the machine with product packages is possible in a simple manner without great manual effort.

A vending machine is known from DE-OS 34 01 519, in which the product packages are arranged in a horizontal stack and a friction wheel driven by a motor is provided as the dispensing device, which pushes the first product package in each case forward, laterally to the stack direction. until the package is separated from the stack and falls into a dispensing shaft.

Here it is furthermore provided that after a product package has been dispensed, the entire "remaining stack" is pushed in the direction of the dispensing device by the force of a spring, until the front package again rests against the friction wheel.

However, if the product packages adhere to one another and due to the stress on the product stack/friction wheel resulting from the spring force pushing on them, a greater effort is required to securely push out the product package, so that a relatively powerful drive motor which demonstrates high power consumption must be used for the dispensing device.

The invention is now based on the task of developing a vending machine of the type stated initially, in such a way that as little energy as possible has to be expended for dispensing the product packages, so that battery operation is possible without problems. In particular, the energy required to single out, i.e. separate the first package from the product stack, is to be reduced to a minimum.

This objective is accomplished owing to the fact that the product packages are arranged standing on their narrow side, on a supporting surface, that a front stack holder device is provided in the dispensing direction with a slot being provided between the supporting surface and the holder which is dimensioned to be greater than the thickness of the product package to be dispensed, and that the product package to be dispensed in each case can be tipped to its broad side by means of the dispensing device.

The advantages achieved with the invention particularly consist of the fact that the power required to single out/dispense a product package is significantly reduced, since the first package is no longer pushed along the next package, resting/rubbing against it, when the package to be dispensed from the product stack is singled out, i.e. separated, but rather is separated from the next package by simply tipping it away sideways. It is particularly advantageous in this if the separated package is tipped onto a slanted surface which is inclined in such a way that the package slips down from it under its own weight and falls into the dispensing shaft of the vending machine.

Since such a separation/dispensing device consists of only a few components, for one thing, and can therefore be produced at a low cost, and for another thing requires relatively little space, several dispensing devices can be arranged in a product row without any problem. This means that the available stack space of a product row can be divided into several partial stacks, which makes it possible to significantly increase the variety of products sold by the vending machine, without any increase in the external dimensions of the vending machine. This results in a higher degree of space utilization of the vending machine, especially if several product types for which there is less demand are to be offered, which until now required a complete shaft of only a partially filled product row for each individual type of product, in the vending machines common until now.

Figure 2:
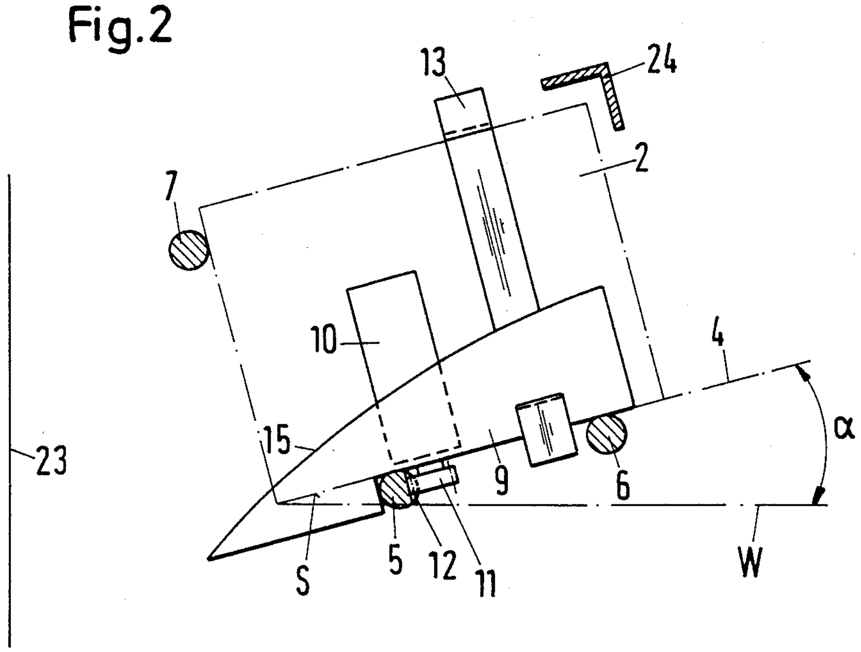
Figure 3:
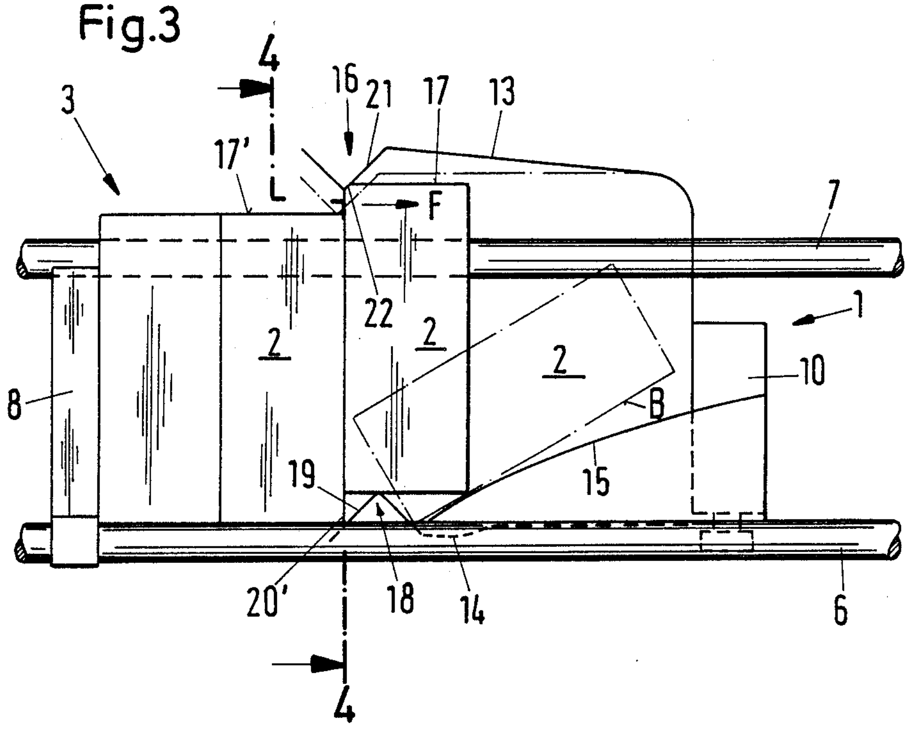
Figure 4:
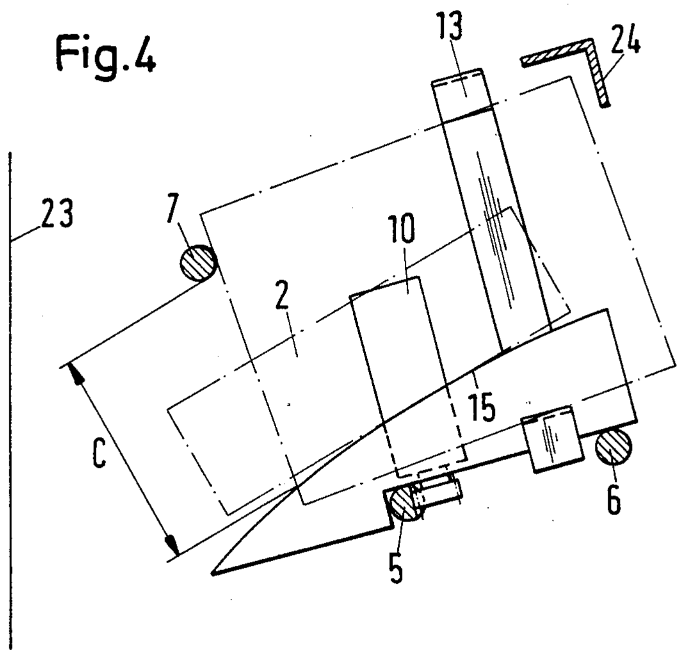
Figure 5:
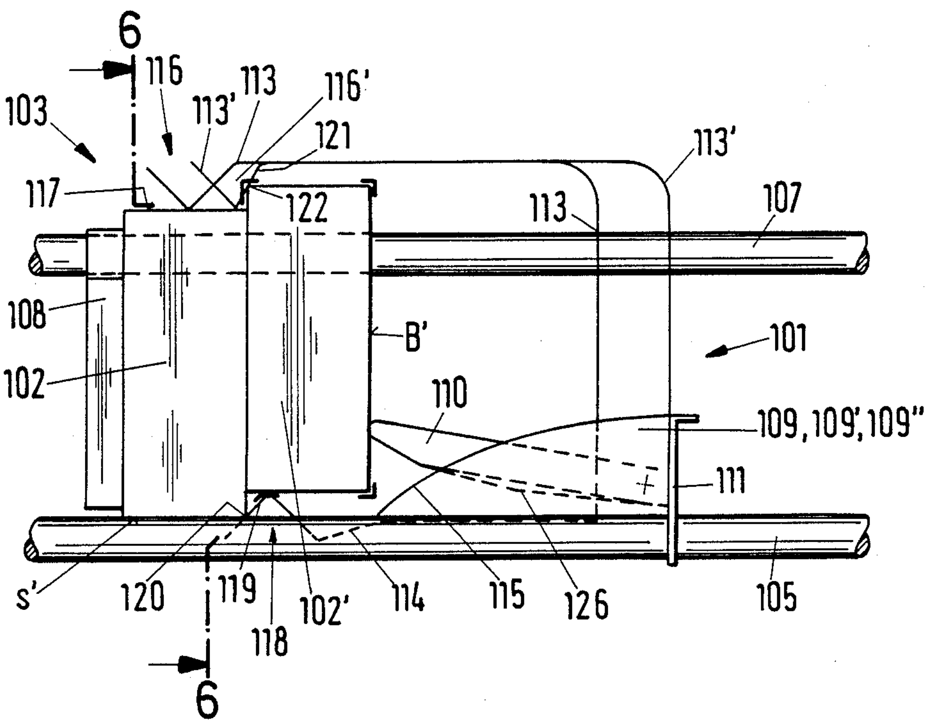
Figure 6:
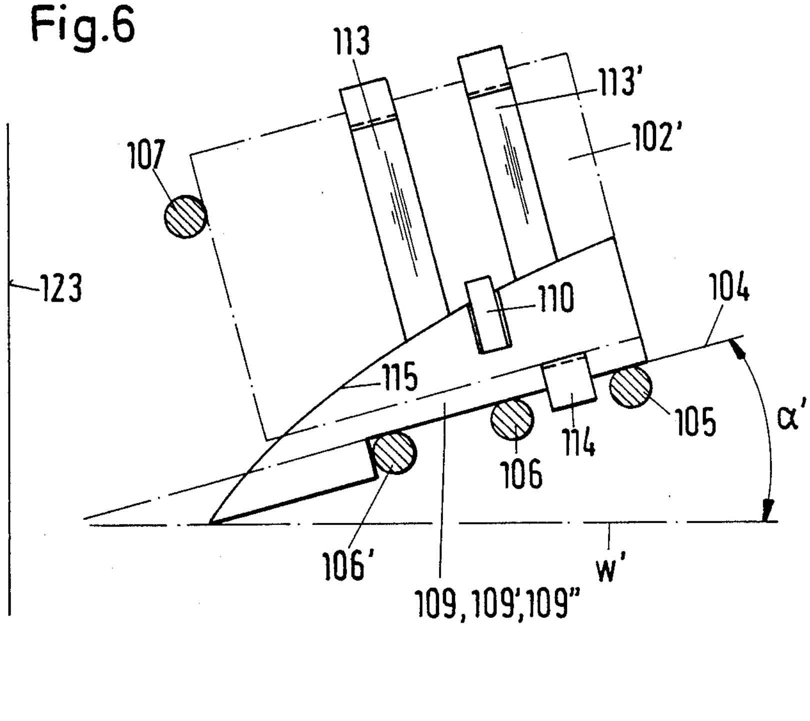
Figure 7:
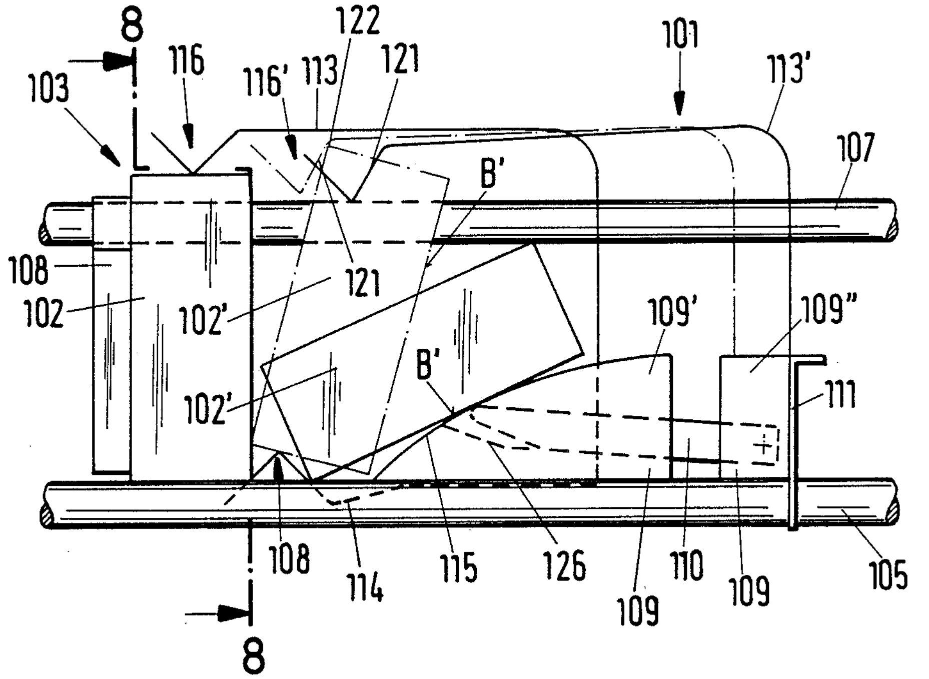
Figure 8:
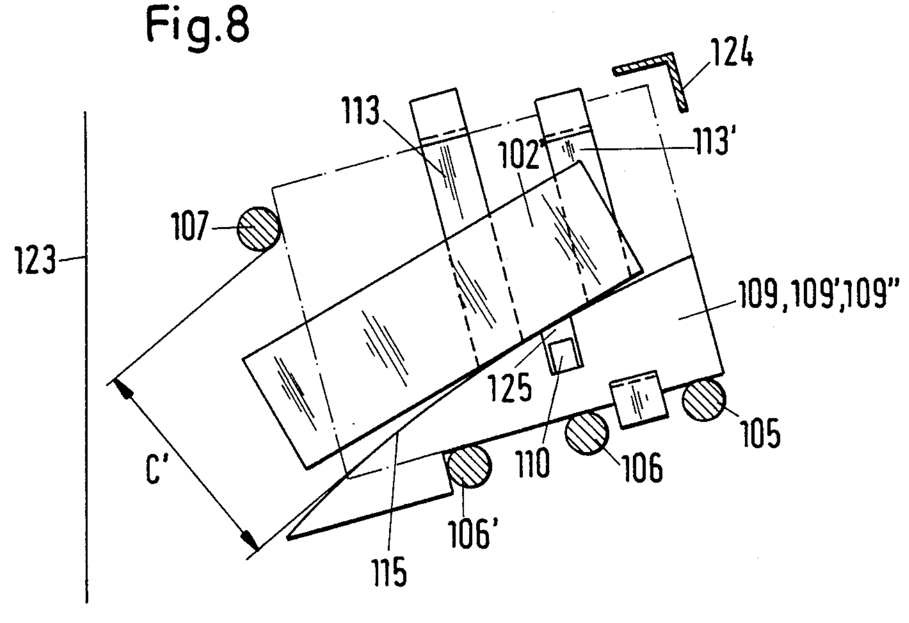
Figure 9:
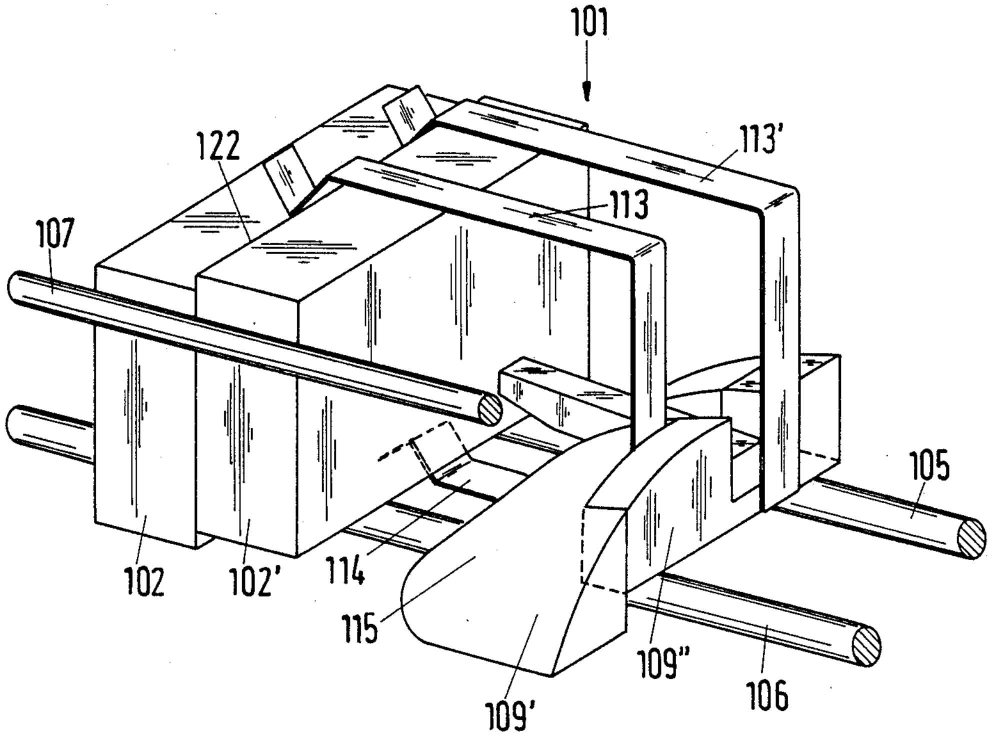
Figure 10:
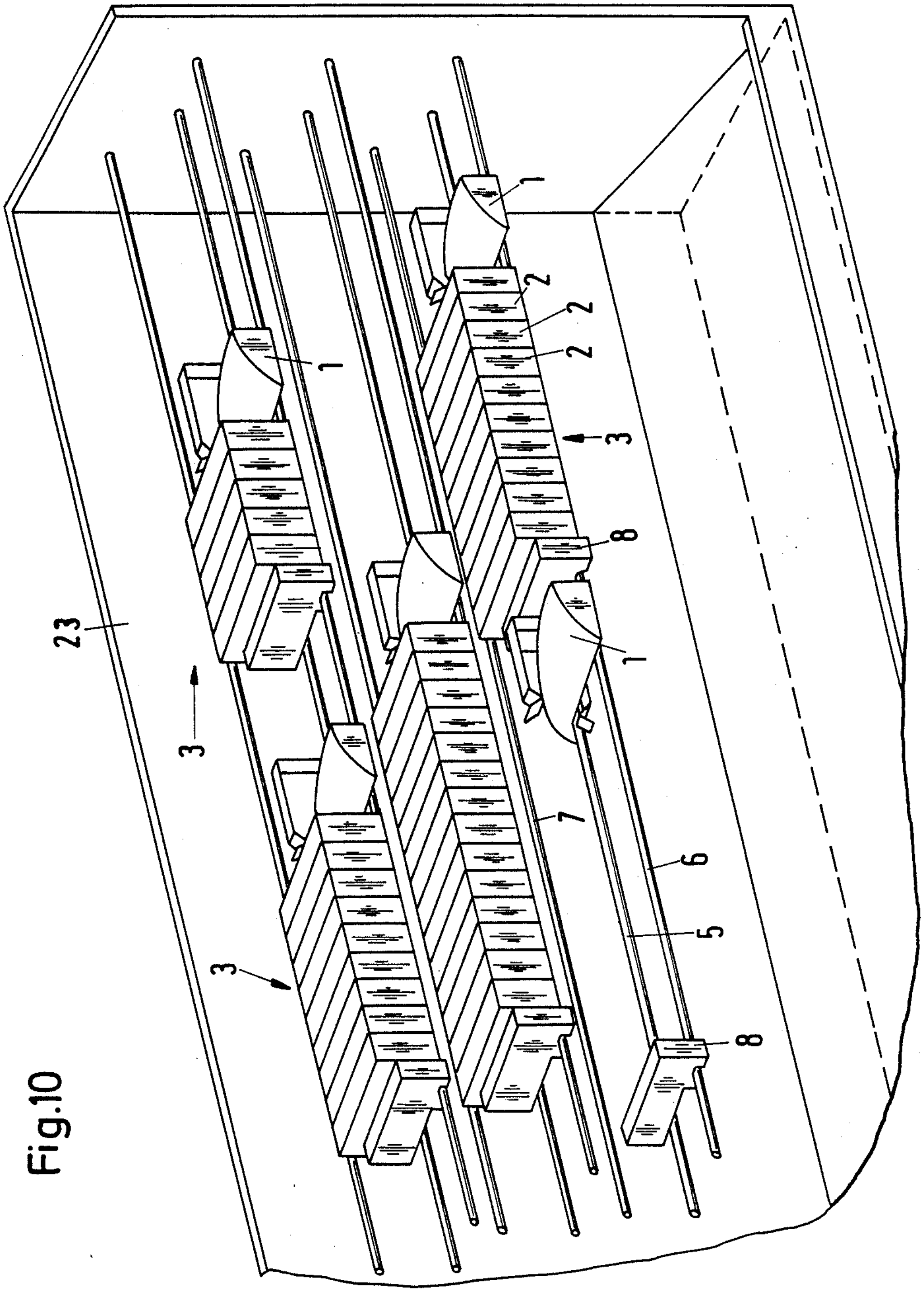

An embodiment of the invention is shown in the drawing and will be explained in greater detail below. The drawings show:

FIG. 1: a view of a product stack with a dispensing device in the readiness/rest position, FIG. 2: a side view of the arrangement of FIG. 1 in a cross section along the line 2—2, FIG. 3: a view of the arrangement of FIG. 1 in the ejection/operating position, FIG. 4: a side view of the arrangement of FIG. 3 in a cross-section along the line 4—4, FIG. 5: a view of a product stack with a modified dispensing device in the readiness/rest position, FIG. 6: a side view of the arrangement of FIG. 5 in a cross-section along the line 6—6, FIG. 7: a view of the arrangement of FIG. 5 in the ejection/operating position, FIG. 8: a side view of the arrangement of FIG. 7 in a cross-section along the line 8—8, FIG. 9: a perspective view of a dispensing device of FIG. 5, and FIG. 10: a view of the interior of a vending machine with dispensing devices of FIG. 1.

FIG. 1 and 2 show a dispensing device 1 of a vending machine. Here, the parallelepiped product packages 2 are arranged in a horizontal product stack 3, standing on their narrow sides S. The supporting plane, i.e. supporting surface 4 for the product packages is formed by two crossbars 5, 6, which are preferably arranged in such a way that the supporting plane 4 runs at an angle o to the horizontal W. An additional, front crossbar 7 prevents the product packages from slipping off the "supporting surface" in this arrangement. On the left side of the product stack 3, an adjustable stop 8 for the product stack is placed on the crossbars 5. 6 and attached.

The dispensing device 1 essentially consists of a carriage 9 placed on the crossbars 5, 6, which is provided with a motor 10. The shaft of the motor is equipped with a gear wheel 11, which meshes with gear teeth 12 provided on the crossbar 5.

The power feed for the motor can be provided by means of a contact line by way of the crossbars 5, 6, which can be installed with insulation, if necessary, or also by means of inductive energy coupling. Furthermore, the dispensing device is provided with two compound springs 13, 14 which touch the first product package of the product stack in each case, as well as with a slanted surface 15, the function of which will be described below.

FIG. 1 and 2 show the dispensing device in the resting, i.e. readiness position, while FIG. 3 and 4 show the position of the dispensing device in the operating, i.e. product ejection position.

In the following, the process of dispensing a product will be described on the basis of FIG. 1 to 4. As already mentioned, the dispensing device 1 shown in FIG. 1 and 2 is in the rest position. In this position, the upper compound spring 13 rests against the top side of the first product package 2 with the tip of its V-shape bend 16, and holds this package tightly enough so that even if the vending machine is severely shaken (attempts at manipulation with intent to defraud), it maintains its position. This holding of the product package is supported by the lower compound spring 14, which is also provided with a V-shaped bend 18, the front slant 19 of which rests against the bottom front end 20 of the first product package.

To dispense a product package 2, after the coins have been inserted, permissibility of dispensing has been checked, and a selection of several dispensing devices, if applicable, is to be activated, etc., current is applied to the motor 10, and the dispensing device 1 is moved towards the product stack 3, with the distance moved corresponding to the width of a product package in each case. When this happens, the lower compound spring 14 is pushed under the first product package with its bent section 18 and raises it slightly. The upper compound spring 13 then slips behind the top side 17 of the package with its bent section 16, until the rear slant 21 of the bent section slips behind the top edge 22 of the lifted product package. When this happens, a force in the direction of the arrow F is exerted on the product package, and the package, which is standing in an extremely unstable position on the tip of the bent section 18 of the lower compound spring, is tipped over onto its broad side B. Then the upper compound spring 13 has already reached the top side 17′ of the next product package, and clamps it so tightly that it cannot also tip over, with the front 19 of the lower compound spring pressing against the front edge 20′ of this package (initial position/rest position).

The product package to be dispensed reached the slanted surface 15 of the dispensing device 1 when it was tipped over, with the former, in combination with the inclined arrangement of the entire dispensing device, being inclined so greatly in the dispensing direction that the tipped product package slips from the dispensing device due to its own weight (gravity) and falls into a dispensing shaft of the vending machine, not shown in detail here.

It is furthermore essential for the entire arrangement that the front crossbar 7 (holder rail) is arranged at such a distance from the supporting surface 4 or slanted surface 15 that the product package can slip through the slot C without hindrance.

Since only very little electrical energy is required to move the dispensing device to tip the first product package, this device is very advantageous for use in battery-driven vending machines. As is clearly evident, several such product stacks with dispensing devices assigned to them can be provided in one product column of a vending machine, where the division of the shaft with regard to product variety and number of product packages per product type can be varied as desired, simply by placing the dispensing devices 1 on the crossbars 5. 6 and placing corresponding stops 8 to delimit. i.e. hold the product stacks.

Preferably, the arrangement of the crossbars/product rows is selected in such a way that the drop direction/dispensing direction of the product packages faces towards the back of the vending machine—the products dispensed are then passed to the front of the vending machine with corresponding slides—so that the product shafts/product rows are easily accessible to the re-filler after the front door of the vending machine has been opened. It is practical for this if holding and delimiting rails 24 are attached to the interior of the door, which move in front of or over the product packages when the door is closed, and prevent the packages from being tipped out of the product row if the entire vending machine is shaken (manipulation attempts).

When the arrangement of the entire device is suitably changed, however, it can also be provided that the drop direction/dispensing direction of the package row faces towards the front of the vending machine. Then the holding and delimiting rails 24 would merely have to be arranged facing towards the back, fixed, while the front crossbar 7 (rail) is attached to the door of the vending machine, so that it comes in front of the product stack(s) when the door is closed, and supports the stack as explained above, or forms the dispensing slot C in combination with the supporting surface/slanted surface 15.

Maintaining the essential principle of lifting, tipping and dispensing the tipped product package' the arrangement can also be changed in such a way, if necessary, that the dispensing device is arranged to be fixed and the product stack itself is shifted by the width of a product package to be dispensed each time. When this happens, the product package closest to the dispensing device in each case is tipped and dispensed. In this version, the dispensing device (compound springs, slanted surface) is formed the same way as described above, but the drive motor 10 and the gears on the crossbar 5 can be eliminated.

FIG. 5 and 6 show a modified dispensing device 101 of a vending machine, where this dispensing device is shown in perspective view in FIG. 9, for the sake of clarity and better recognition of the essential principle.

In this embodiment, again, the parallelepiped product packages 102, 102′ are arranged to stand on their narrow sides S′, in a horizontal product stack 103. The supporting plane, i.e. supporting surface 104 for the product packages is formed by crossbars 105. 106, 106′, which are preferably arranged in such a way that the supporting surface 104 runs at an angle $\alpha'$ to the horizontal W′. Here again, an additional front crossbar 107 prevents the product packages from slipping from the "standing surface." On the left side of the product stack 103, an adjustable stop 108 for the product stack is placed on the crossbar 107 and attached.

The dispensing device essentially consists of a two-part carriage 109/109′, 109″, placed on the crossbars 105, 106, 106′. At least one of the crossbars is formed as a threaded spindle, which acts on the carriage 109 by way of a carrier 111 which meshes with it, this carrier in turn being attached to the carriage section 109″. When the threaded spindle is turned, the carriage is therefore moved.

It can be provided that several carriages (e.g. three) are placed on the crossbars 105. 106, 106′ in one product row. Then all three crossbars are formed as threaded spindles, and a carriage with a carrier arranged at a corresponding location, is assigned to each of them, so that the carriages can be individually moved, depending on which of the spindles is activated/turned. The spindles are driven by electrical motors assigned to them, or possibly by a single drive motor which can be connected with the spindle to be driven in each case by way of suitable gears/clutches. On the carriage 109, two upper compound springs 113, 113', a lower compound spring 114, a locking cam 110, as well as a slanted surface 115 are provided, whose method of effect will be described below. FIGS. 5 and 6 show the dispensing device 101 in the rest or readiness position, while FIG. 7 and 8 show the position of the dispensing device in the operating or product ejection position. In the readiness position of the carriage 109/109', 109'' shown in FIG. 5 and 6, the upper compound spring 113 rests against the top side 117 of the product package 102 to be dispensed, with the tip of the V-shaped bent section 116 at its end, and holds it in place. This holding action is reinforced by the lower compound spring 114, which is also provided with a V-shaped bent section 118, the front slant 119 of which rests against the bottom front edge 120 of this product package. The first product package 102' stands on the tip of the bent section 118 of the spring 114 when it is raised by this spring, with the upper compound spring 113' moving behind the top edge 122 of this package (rear slant 121 of the bent section 116'). A locking cam 110 arranged on the carriage presses against the broad side B' of the first product package and holds it tightly in its position.

We now refer to FIG. 7 and 8 and explain how the product package is dispensed. After the coins have been inserted, permissibility of dispensing has been checked, and a selection of several dispensing devices, if applicable, is to be activated, etc., the crossbar 105 (threaded spindle) is rotated, which moves the rear part 109'' of the carriage 109 away from the product stack 103. The front part 109' of the carriage 109 remains in its original position and the compound spring 113 attached to it continues to press against the top side of the product package 102. In the same way, the lower compound spring 114, which is also connected with this part of the carriage, retains its position relative to the package 102, so that this package is held securely, without problems. With the backward movement of the carriage part 109'', the locking cam 110 is retracted and falls into a recess 125 of the front carriage part 109'. At the same time, the slant 121 of the bent section 116' of the upper compound spring 113'—the compound spring being attached to the carriage part 109'' which is being moved back - presses against the edge 122 of the package 102' to be dispensed, takes it along and finally tips it over onto its broad side B'. When this happens, the package falls over onto the slanted surface 115 of the fixed carriage part 109', with the former, in combination with the inclined arrangement of the entire dispensing device, being inclined so greatly in the dispensing direction that the tipped product package slips from the dispensing device due to its own weight (gravity) and falls into a dispensing shaft of the vending machine, not shown in detail here. However, it is also essential in this embodiment that the front crossbar 107 (holder rail) is arranged at such a distance from the supporting plane 104, i.e. the slanted surface 115, that the product package 102' can slip through the slot C' without hindrance.

After the package has been dispensed, possibly being monitored by means of sensors, microswitches or similar devices, the crossbar/spindle 105 is turned in the opposite direction and the driven carriage part 109'' is moved towards the product stack. At the same time, as soon as this carriage part 109'' reaches the other carriage part 109', the latter is also shifted along with it in the direction of the product stack. Then, the bent section 118 of the lower compound spring 114 is pushed under the product package 102 which is now first and raises it. At the same time, the upper compound spring 113 is moved, so that it reaches the top side of the next product package and holds it tightly. Also as part of this working cycle, the compound spring 113' is pushed over the first product package, until it comes down behind it by spring action and its slant 121 lies behind the top edge 122 of the package.

The locking cam 110 is also lifted above the slide incline 126 in the recess 125 during this movement, and finally pressed against the broad side B' of the first product package. Therefore the initial position of the arrangement, as shown in FIG. 5, has been reached again, and the device is ready to dispense another product package.

Since only very little electrical energy must be expended for moving this dispensing device to tip and dispense the first product package, this arrangement can be used very advantageously for battery-driven vending machines. As already mentioned, several such product stacks can be provided in a product row, each with a dispensing device assigned to them, and the shaft division with regard to variety of products and number of product packages per type of product can be varied as desired by simply placing the dispensing device 101 on the crossbars/spindles 105, 106, 106' and placing corresponding stops 108 to delimit. i.e. hold the product stacks.

Preferably, the arrangement of the crossbars/product rows is selected in such a way that the drop direction/-dispensing direction of the product packages faces towards the back 123 of the vending machine—the packages dispensed are then guided to the front of the vending machine by way of suitable slides—so that the product shafts/product rows are easily accessible to a re-filler after the front door of the vending machine has been opened. It is practical for this if holding and delimiting rails 124 are attached to the interior of the door, which move in front of or over the product packages when the door is closed, and prevent the packages from being tipped out of the product row if the entire vending machine is shaken (manipulation attempts).

Of course, it can also be provided, when this modified dispensing device 101 is used, similarly as was already explained with regard to the dispensing device 1, that the drop direction/dispensing direction of the package row faces towards the front of the vending machine. Then the holder rail 124 would be arranged facing towards the back, fixed, while the front crossbar 107 is attached to the door of the vending machine, so that swings away when the door is opened.

Finally, for the sake of completeness, FIG. 10 also shows a simplified view of the interior of a vending machine. Here, several product stacks 3 are provided in a horizontal arrangement on the crossbars 5, 6, which form the supporting surface. i.e. supporting plane for the stacks. A dispensing device 1 is assigned to each product stack, which is formed as described above with regard to FIG. 1 to 4. Of course the dispensing devices could also be formed in accordance with the dispensing device 101 described in FIG. 5-9, and be within the scope of the invention. As the representation in FIG. 10 shows, the product stacks are arranged in the vending machine in such a way that they are easy to see and take up little space, so that optimum utilization of the available interior of the vending machine is possible.

What is claimed is:

1. A vending machine for dispensing packages comprising elongated support means for supporting a plurality of packages in a substantially horizontal stack, an elongated holder means spaced from said support means to define a slot between said support means and said holder means, said packages having one dimension which exceeds the width of said slot such that when said packages are oriented in one direction, said packages are supported in said stack by said support means and said holder means, said packages having another dimension which is less than the width of said slot, and dispensing means operable to engage an end package in said stack and to tip said end package to thereby orient said other dimension of said package to face said slot so that the package passes through said slot and is thereby dispensed through said slot, said dispensing means having a first position juxtaposed to said end package to be dispensed and a second position juxtaposed to the next succeeding package in said stack, said dispensing means having an upper spring means and a lower spring means, drive means being provided to effect relative movement between said dispensing means and said stack from said first position to said second position, said upper spring means and said lower spring means being operable during said relative movement from said first position to said second position to effect said tipping of said end package, said lower spring means engaging and raising said end package relative to said support means during said relative movement from said first to said second position.

2. A vending machine according to claim 1, wherein said packages are parallelpipeds having a base and sides, said support means defining a support plane on which the base of said packages in said stack is disposed with said base being parallel to said support plane, said one dimension of said package being one of the dimensions of said sides, said other dimension of said package being one of the dimensions of said base such that said dispensing means tips said end package to orient said tipped package so that the base of the tipped package is non-parallel with said support plane.

3. A vending machine according to claim 2, wherein said support means defines a support plane which is inclined at an acute angle relative to horizontal.

4. A vending machine according to claim 3, wherein said incline is adjustable.

5. A vending machine according to claim 1, wherein said elongated support means is parallel to said elongated holder means such that said slot therebetween has elongated parallel sides which are spaced from one another a distance which defines the width of said slot, and further comprising a package-receiving passage generally underlying said slot and which receives said package after passing through said slot.

6. A vending machine according to claim 5, wherein said dispensing means comprises surface means operable to guide said end package to said slot after the package has been tipped such that the tipped package falls by gravity through said slot to said package-receiving passage underlying said slot.

7. A vending machine according to claim 6, wherein said surface means comprises a receiving surface onto which said package falls upon being tipped, said receiving surface being inclined downwardly toward said package-receiving passage such that when the package is tipped, the package slides along said receiving surface by its own weight to said package-receiving passage.

8. A vending machine according to claim 1, wherein said dispensing means has drive means to move the dispensing means longitudinally along said elongated support means, said stack of packages being maintained stationary as said drive means moves said dispensing means along said elongated support means to successively tip and dispense successive end packages of the stationary stack.

9. A vending machine according to claim 1, wherein said dispensing means is fixed in position on said support means, and means are provided for advancing said stack toward said dispensing means as said dispensing means tips and dispenses successive end package of the stack.

10. A vending machine according to claim 1 wherein said support means comprises two horizontal rails.

11. A vending machine according to claim 1, wherein said holder means comprises a horizontal rail.

12. A vending machine according to claim 1, wherein said upper and lower spring means engage and support said end package when in said first position and engage and support said next succeeding package when in said second position.

13. A vending machine according to claim 1, wherein said upper spring means comprises a longitudinally extending leaf-spring element.

14. A vending machine according to claim 1, wherein said support means comprises elongated rail elements, said dispensing means being mounted on said rail elements.

15. A vending machine according to claim 14, wherein one of said rail elements has threaded means thereon, said dispensing means having a carriage which is moved along said rails by said threaded means.

16. A vending machine according to claim 1, wherein said dispensing means includes a drive means for driving the dispensing means along said support means.

17. A vending machine according to claim 16, wherein said drive means comprises an inductive coupling means and a battery.

18. A vending machine according to claim 1, wherein said dispensing means is placeable on said support means along any desirable location along the longitudinal extent of said support means.

19. A vending machine according to claim 1, wherein a plurality of said dispensing means are mounted on said elongated support means.

20. A vending machine according to claim 1, further comprising electronic means for operating and controlling said dispensing means.

21. A vending machine according to claim 1, further comprising a lateral stop on said support means engageable with the last package in a stack such that the stack is disposed between said lateral stop and said dispensing means.

22. A vending machine according to claim 21, wherein the vending machine has a front side and a back side, with said front side having a door, said packages being dispensed by said dispensing means toward said front side.

23. A vending machine for dispensing packages comprising elongated support means for supporting a plurality of packages in a substantially horizontal stack, an elongated holder means spaced from said support means to define a slot between said support means and said holder means, said packages having one dimension which exceeds the width of said slot such that when said packages are oriented in one direction, said packages are supported in said stack by said support means and said holder means, said packages having another dimension which is less than the width of said slot, and dispensing means operable to engage an end package in said stack and to tip said end package to thereby orient said other dimension of said package to face said slot so that the package passes through said slot and is thereby dispensed through said slot, said dispensing means having a first position juxtaposed to said end package to be disposed and a second position juxtaposed to the next succeeding package in said stack, said dispensing means having an upper spring means and a lower spring means, drive means being provided to effect relative movement between said dispensing means and said stack from said first to said second position, said upper spring means and said lower spring means being operable during said relative movement from said first position to said second position to effect said tipping of said end package, said upper spring means comprising two spring elements, one of said spring elements engaging and effecting said tipping of said end package during said relative movement from said first to said second position, the other of said spring elements engaging and supporting said next succeeding package during said tipping of said end package.

24. A vending machine according to claim 23, wherein said other spring element engages said next succeeding package to prevent the latter from being lifted as said lower spring means raises said end package and said one spring element and said lower spring means effect tipping of said end package.

25. A vending machine for dispensing packages comprising elongated support means for supporting a plurality of packages in a substantially horizontal stack, an elongated holder means spaced from said support means to define a slot between said support means and said holder means, said packages having one dimension which exceeds the width of said slot such that when said packages are oriented in one direction, said packages are supported in said stack by said support means and said holder means, said packages having another dimension which is less than the width of said slot, and dispensing means operable to engage an end package in said stack and to trip said end package to thereby orient said other dimension of said package to face said slot so that the package passes through said slot and is thereby dispensed through said slot, said dispensing means having a first position juxtaposed to said end package to be dispensed and a second position juxtaposed to the next succeeding package in said stack, said dispensing means having an upper spring means and a lower spring means, drive means being provided to effect relative movement between said dispensing means and said stack from said first position to said second position, said upper spring means and said lower spring means being operable during said relative movement from said first position to said second position to effect said tipping of said end package, said dispensing means comprising a first and a second carriage part, said upper spring means having a first and a second spring element, said first spring element and said lower spring means being mounted on said first carriage part, said second spring element being mounted on said second carriage part, said second carriage part being driven by said drive means in a direction away from said stack and away from said first carriage part as said second spring element engages said end package and effects tipping of said end package, said second carriage part being subsequently movable in an opposite direction toward said stack by said drive means to engage said first carriage part such that said first and second carriage parts are moved together toward said stack to said second position, said lower spring means lifting the next succeeding package as said first and second carriage parts move to said second position.

26. A vending machine according to claim 25, further comprising a slanted surface means on said first carriage part onto which the tipped package falls.

27. A vending machine according to claim 25, further comprising a cam means mounted on said second carriage part which is operable to engage said next succeeding package when said first and second carriage parts are in said second position, said cam means being guidingly supported by said first carriage part.

28. A vending machine according to claim 27, wherein said cam means comprises an elongated cam part which is pivotably mounted on said second carriage part, said first carriage part having a recess in which said cam part is slidably received.

* * * * *